UNITED STATES PATENT OFFICE.

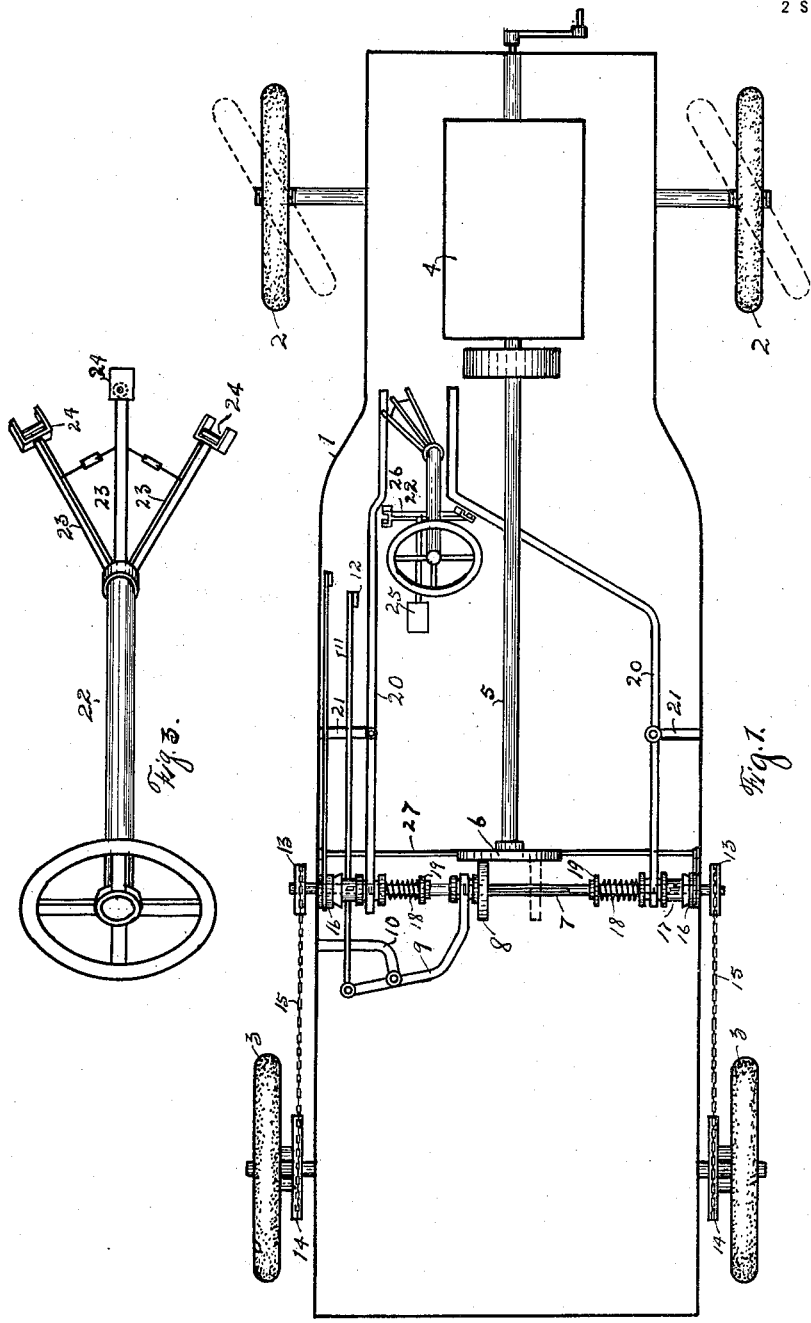

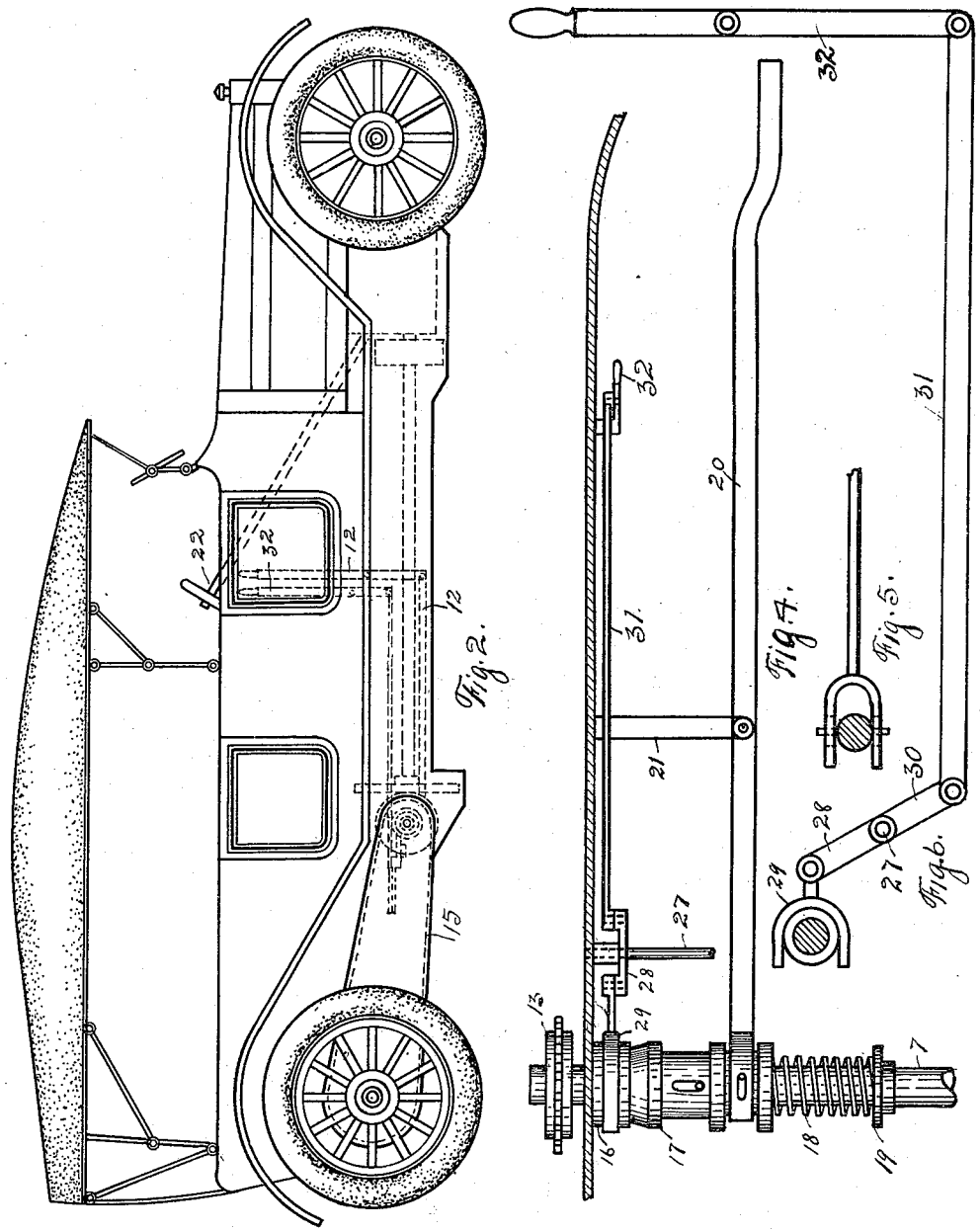

ANTHONY S. MANISCALCO, OF HOUSTON, TEXAS.

DIFFERENTIAL MECHANISM FOR AUTOMOBILES.

1,157,319.     Specification of Letters Patent.     Patented Oct. 19, 1915.

Application filed December 12, 1914. Serial No. 876,817.

*To all whom it may concern:*

Be it known that I, ANTHONY S. MANISCALCO, a citizen of the United States, residing at Houston, in the county of Harris and State of Texas, have invented certain new and useful Improvements in Differential Mechanism for Automobiles, of which the following is a specification.

This invention relates to new and useful improvements in a differential mechanism for automobiles, and also includes the means for transmitting power from the motor to the traction wheels of the machine.

The object of the invention is to provide a device of the character described, whereby the traction wheels may be easily disconnected from the motor and whereby, as the machine is turned, as in passing around a curve or corner, the traction wheel on the inner side will be automatically declutched from the motor.

A further object of the invention resides in the provision of means for controlling the transmission of power from the motor to the traction wheels.

With the above and other objects in view, the invention has particular relation to certain novel features of construction, operation and arrangement of parts, an example of which is given in this specification and illustrated in the accompanying drawings, wherein;

Figure 1, is a plan view of the automobile, equipped with my improved device. Fig. 2, is a side elevation thereof. Fig. 3, shows a perspective view of the type of steering post employed. Fig. 4, shows a fragmentary view of the clutch for connecting and disconecting the motor from the traction wheels. Fig. 5, is a fragmentary view of the clutch operating lever, and Fig. 6, shows the type of brake employed.

Referring now more particularly to the drawings wherein like numerals of reference designate similar parts in each of the figures; the numeral 1 refers to the automobile frame, which is mounted on suitable front steering wheels, 2, 2, and rear traction wheels, 3, 3.

The numeral 4, refers to the motor, which is operatively connected with and drives the shaft 5, whose rear end has the friction disk fixed thereon. A transverse counter shaft 7, is mounted, in suitable bearings on the frame and carries the disk 8, which is slidably mounted thereon, but keyed thereto, and whose periphery is in rolling contact with the rear face of the disk 6. This disk 8, is movable back and forth, on the shaft 7, by means of the lever 9, which is fulcrumed on the support 10 and one end of which has a pivotal connection with the disk 8, and whose other end is pivoted to the rear end of the rod 11, which is manipulated through the hand lever 12. It is obvious that by the manipulation of the hand lever 12, the disk 8 may be moved back and forth, relative to the disk 6, and the speed and direction of the machine thus controlled.

Loosely mounted upon the outer ends of the shaft 7, are the sprocket wheels 13, 13, in alinement with corresponding sprocket wheels 14, 14, carried by the hubs of the respective traction wheels 3, 3. The last mentioned sprocket wheels are driven from the former, through the sprocket chains 15, 15. The sprocket wheels 13, 13, have extended hubs, as 16, 16, formed into clutch members and opposing which are corresponding clutch members, 17, 17, slidably mounted on the shaft 7, but keyed thereto, so as to rotate therewith. These corresponding clutch members form a clutch, preferably of the cone type, by means of which the corresponding traction wheels may be clutched with, or declutched from, the shaft 7. The respective clutch members 17, 17, are normally held in engagement with their corresponding clutch members 16, 16, by means of the coil springs, 18, 18, which surround the shaft 7 and are interposed between the collars, 19, 19, fixed thereon, and the inner ends of the respective clutch members 17, 17. Two clutch levers, 20, 20, are provided, which are fulcrumed on the respective supports 21, 21, fixed to the frame work of the machine on each side. The rear ends, of these respective levers, are pivoted to the corresponding clutch members 17, 17, and their forward ends converge and extend up toward the front of the machine.

The usual steering post, 22, is provided, whose lower end carries the radiating arms 23. The free ends of these arms are bifurcated and between the fingers thereof, are the roller bearings 24, in alinement with the forward ends of the respective levers, 20, 20.

When the steering post is turned in one direction, as, for example, in turning the machine toward the left, as illustrated in dotted lines in Fig. 1, the roller of the arms 23, on the right, will contact with the forward ends of the corresponding lever 20, forcing it outwardly and declutching the traction wheel, on the corresponding side, from the counter shaft 7. When the steering post is returned to its original position, the corresponding coil spring 18, will again operate to clutch the traction wheels with said shaft. In like manner when it is desired to turn the machine in the opposite direction, the traction wheels on the opposite side, or on the inner side of the curve, will be declutched. This is essential, inasmuch as the traction wheel on the inner side of the curve, must travel at a slower rate of speed than the one on the outer side, and, by the mechanism herein described, the wheel upon the inner side, will always be automatically declutched through the operation of the steering post in turning the machine.

It is sometimes desirable to completely declutch both traction wheels from the engine. For that purpose, I have provided the foot lever, 25, whose forward end carries a cross arm, 26, whose opposite ends are bifurcated and between the fingers of which, the forward ends of the lever 20, 20, rest. Inasmuch as the forward ends of this lever converge, a pressure on the foot lever, 25, would operate through the arm 26, to force the forward ends of the lever, 20, 20, apart, and simultaneously declutch the traction wheels from the counter shaft 7.

A transverse brake shaft, 27, is mounted in suitable bearings, carried by the frame, and fixed to the respective ends thereof, are the arms, 28, 28, to whose free ends are pivoted the brake shoes, 29, 29, which fit against the respective clutch members, 16, 16. An arm, 30, is carried by the shaft 27, and depends therefrom, and its free end is connected by means of the link, 31, to the lower end of the brake lever, 32. By the manipulation of this lever, it is obvious that the brake shoes, 29, 29, may be driven against, or withdrawn from the respective clutch members, 16, 16, and brakes thus, in effect, applied to the traction wheels of the machine.

While I have shown only one form of this device, it is apparent that the mechanical structure thereof, may be changed without departing from the principle of the invention, and I hereby reserve the right to make such modifications in the structure thereof, as do not depart from the scope of the appended claim.

What I claim is:

A device of the character described including a frame work, steering wheels and traction wheels, supporting the same, a steering post in operative connection with the steering wheel, a motor, a transverse counter shaft in operative connection with the motor, a means in operative connection with said counter shaft and said traction wheels, and delivering power from the former to the latter, clutches mounted on said shaft, and provided to connect and disconnect the same from said power-delivering means, a lever fulcrumed upon the frame work and pivoted at one end to each of said clutches, the other ends of said levers converging together and a manual means between the converging ends of said levers, whereby said ends may be forced apart and both traction wheels simultaneously declutched from the counter shaft.

In testimony whereof I have signed my name to this specification in the presence of two subscribing witnesses.

ANTHONY S. MANISCALCO.

Witnesses:
   F. A. LIDDELL,
   C. BAYLOR HULL.